United States Patent [19]

Pohle

[11] 4,273,446

[45] Jun. 16, 1981

[54] LIGHT SPOT POSITION SENSOR FOR A WAVEFRONT SAMPLING SYSTEM

[75] Inventor: Richard H. Pohle, Cupertino, Calif.

[73] Assignee: The United States of America as represented by the Secretary of the Air Force, Washington, D.C.

[21] Appl. No.: 52,163

[22] Filed: Jun. 26, 1979

[51] Int. Cl.³ .............................................. G01B 9/02
[52] U.S. Cl. ................................................ 356/354
[58] Field of Search ................................... 356/354

[56] References Cited

U.S. PATENT DOCUMENTS

| | | | |
|---|---|---|---|
| 3,090,279 | 5/1963 | Chisholm | 356/354 |
| 3,291,991 | 12/1966 | Welti | 250/83.3 |
| 3,500,050 | 3/1970 | Hillman | 250/214 |
| 3,532,894 | 10/1970 | Devine | 250/233 |
| 3,549,239 | 12/1970 | Brienza et al. | 356/354 |
| 3,606,548 | 9/1971 | Dyson | 356/128 |
| 3,614,235 | 10/1971 | Munnerlyn | 356/354 |
| 3,950,099 | 4/1976 | Malueg | 356/28 |

Primary Examiner—John K. Corbin
Assistant Examiner—Scott J. Sugarman
Attorney, Agent, or Firm—Donald J. Singer; Jacob N. Erlich

[57] ABSTRACT

A light spot position sensor for a wavefront sampling system having a crossed Ronchi chopper disk interposed between the diffracted laser beams of the wavefront sampling system and the intensity detectors located within the wavefront sampler. The crossed Ronchi chopper disk interrupts, at a predetermined interval, the diffracted beam of light which focuses as a spot on the disk. The relative position of the spot(s) is determined with respect to an alignment beam, the position of which is known. By means of appropriate electronics the electronic phase of each frequency of the spot is detected and compared with the phase of each frequency of the known spot to provide a two axis spot position location.

8 Claims, 2 Drawing Figures

LIGHT SPOT POSITION SENSOR FOR A WAVEFRONT SAMPLING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to laser beam projectors or telescopes, and, more particularly, to a light spot position sensor for a wavefront sampling system.

Laser beams have a number of remarkable properties. Because of their spatial coherence, they have an extremely small divergence and are therefore highly directional. A laser beam because it possesses space coherence, can be focused to form a spot whose diameter is of the order of one wavelength of the laser light itself. Enormous power densities are thus obtainable. Accordingly, system applications of lasers are useful for communication in space, on earth and undersea, as well as in surveillance and weapon systems.

In may laser systems it is desirable to concentrate the projected laser energy into a small area in the object plane. In order to accomplish this end, large optics in the projector system are required. To achieve the high performance theoretically possible with such large optics, other parts of the projection system must also perform at comparable levels of high accuracy. For example, at diameters of 4.3 meters with $\lambda=2.7\mu$, the radius of the Airy disc is only 0.77 $\mu$R. To deposit energy upon a given target area of $\frac{3}{4}$ of the ideal rate, the boresight error can be only about 0.2 $\mu$R even assuming a perfect projected beam. On the other hand, if we assume a perfect boresight, the projected wavefront error allowable to achieve the $\frac{3}{4}$ maximum deposition rate is only $\lambda/13$ rms.

To assure this high accuracy in the projected beam, a wavefront sampling system should incorporate therein the following characteristics:

1. It should have a negligible insertion loss;
2. It should provide a signal to the wavefront sensors which is sufficiently and uniformly attenuated;
3. It should sample over the entire aperture;
4. It should give a measurement of the projected wavefront phase accuracy after the wavefront has left the last optical surface;
5. It should be independent of those factors which do not affect energy density on the target (that is, laser wavelength changes, etc.);
6. It should measure net projected wavefront tilt (boresight) as well as relative wavefront inaccuracies; and
7. The wavefront analysis method should be capable of sufficient accuracy and signal to noise for general application.

The wavefront sampling system set forth in U.S. patent application Ser. No. 922,062 filed July 7, 1978 by the same inventor as the instant invention is capable of meeting the above operational criteria. However, the problem arises within the wavefront sampling system as how to accurately measure the relative spot positions of the generated beams at high bandwidths.

SUMMARY OF THE INVENTION

The light spot position sensor of the instant invention overcomes the problems encountered in the past by being incorporated within a wavefront sampling system of the type described in the aforementioned U.S. patent application Ser. No. 922,062 and thereby accurately measuring the separation of two or more visible or infrared light spots.

The output wavefront sampling system of type in which the instant invention is incorporated utilizes a quasi-monochromatic beam of light such as from a laser in conjunction with a beam expander. The beam expander is made up of a primary and a secondary mirror as well as a wavefront sensor which contains therein at least one detector. In addition, a plurality of relatively small, closely spaced reflective holographic phase gratings are placed on the primary mirror surface. The light spot position sensor of this invention is located within the wavefront sensor and utilizes a device optically interposed between the secondary mirror and the detectors for interrupting the intensity of a spot formed by the generated laser beam. This device takes the form of a crossed Ronchi chopper disk or spinning cylinder. The grating period of the Ronchi chopper disk must be larger than twice the spot size so that a full chopping (blockage) of the spot will occur. The grating of the Ronchi chopper need not have transparent and opaque portions of equal width as long as the opaque portions completely block the incoming beam. Furthermore, it must be realized that one intensity detector within the wavefront sensor is utilized to serve each beam, that is, if two spots are incident on the Ronchi disk, two intensity detectors are required. It is critical that the light spot from one beam does not enter the detector associated with the other spot.

During operation of the wavefront sampling system having the light spot sensor of this invention incorporated therein, one light spot is required whose spatial position is accurately and absolutely known. This is accomplished by means of a conventional alignment beam device. The beam whose position is unknown passes through the Ronchi chopper disk forming a spot thereon and is incident upon its corresponding intensity detector which measures the phase of the chopping. By the utilization of the crossed grating Ronchi disk as in the instant invention the measurement of the spot position in two directions is possible, that is, the direction along the grating period and the positions in the orthogonal axis. With such an arrangement the period of the two crossed gratings of the Ronchi disk must differ so that the chopped signal contains two frequency components. The two frequency components in the detected signal are separated electronically by conventional means and the electronic phase of each frequency is detected separately or synchronously to provide two axis spot position location.

It is therefore an object of this invention to provide a light spot position sensor for a wavefront sampling system.

It is another object of this invention to provide a light spot position sensor for a wavefront sampling system which can accurately measure the separation of two or more visible or infrared light spots.

It is still another object of this invention to provide a light spot position sensor for a wavefront sampling system which is operational at high bandwidths.

It is still another object of this invention to provide a light spot position sensor for a wavefront sampling system which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

Figure 1:
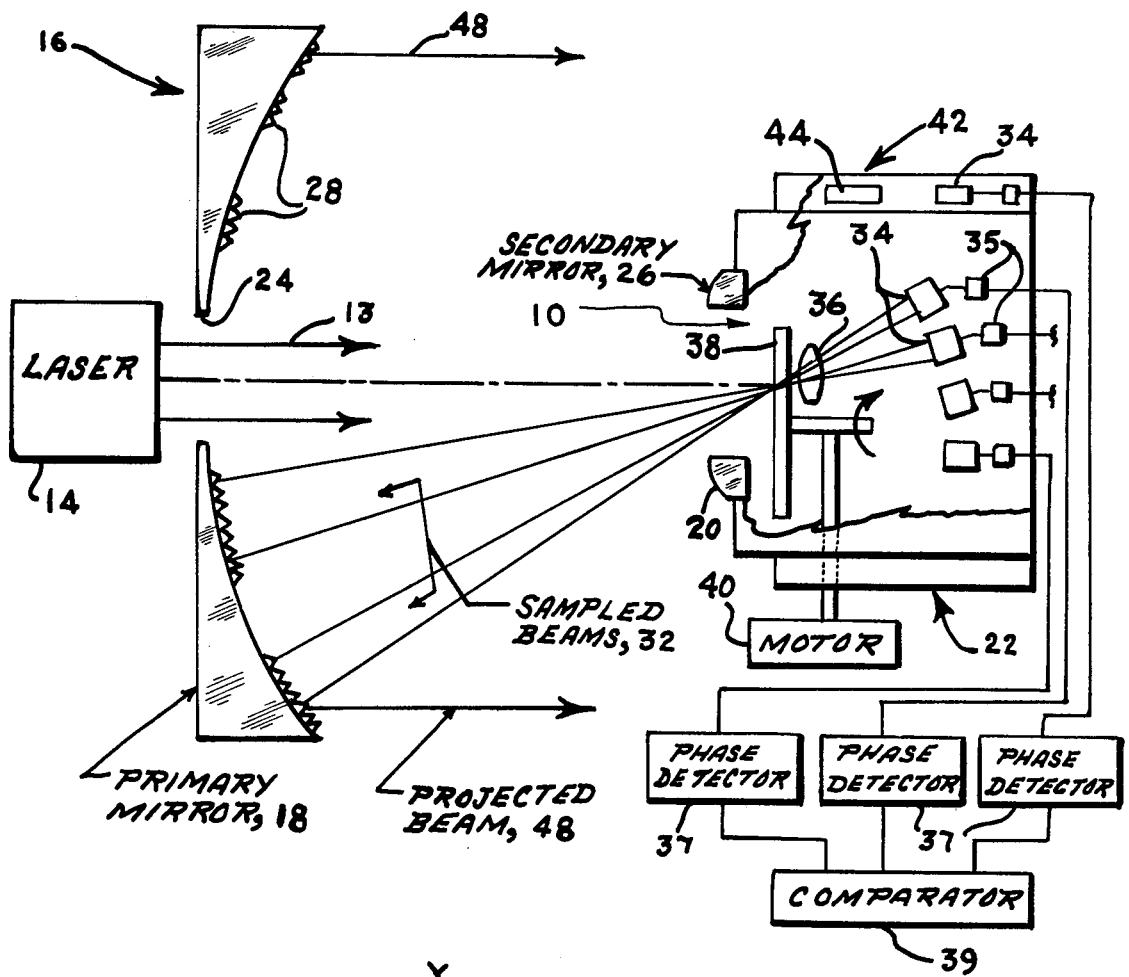
Figure 2:
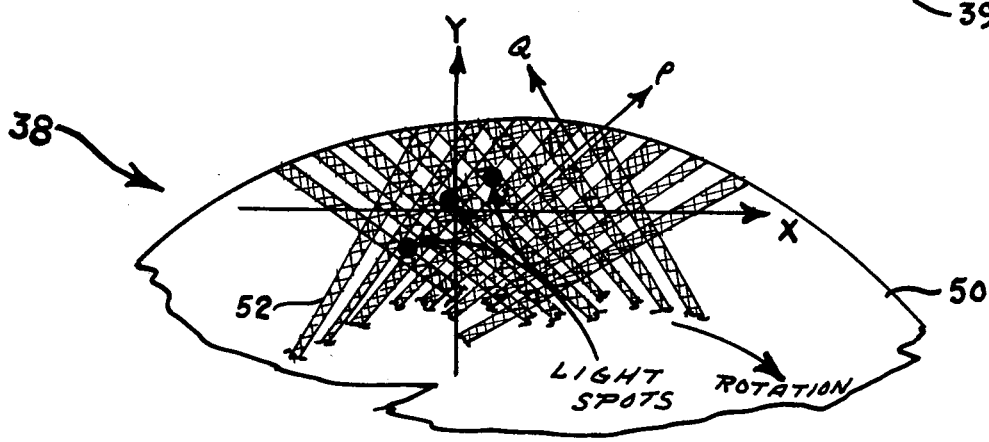

FIG. 1 is a schematic representation of the light spot position sensor of this invention incorporated within a wavefront sampling system; and FIG. 2 is a front segmented view of the crossed Ronchi chopper disk utilized with the light spot position sensor of this invention.

DETAILED DESCRIPTION OF THE PREFERRED EMBODIMENT

Reference is now made to FIG. 1 of the drawing which illustrates in schematic fashion the light spot position sensor 10 of this invention incorporated within a wavefront sampling system 12 of the type described in U.S. patent application Ser. No. 922,062 filed July 7, 1978 by the same inventor as this invention. System 12 is made up of a means for providing a quasi-monochromatic beam of light 13. This means is generally in the form of any conventional laser source 14. Located adjacent to and in optical alignment with laser beam 13 of laser 14 is a projector or beam expander 16.

Beam expander 16 has three basic components, a primary reflective surface or concave mirror 18, a secondary reflective surface or convex mirror 20 and at least one wavefront sensor 22 to be described in more detail hereinbelow. Each mirror 18 and 20, of beam expander 16 has a centrally located aperture 24 and 26, respectively, therein. Aperture 24 in primary mirror 18 is optically aligned with laser beam 13 and allows beam 13 to pass therethrough while aperture 26 in secondary mirror 20 allows entrance of a portion of the reflected beams in the form of beams 32, for example, to be sampled by wavefront sensor 22. It should, however, be noted that although mirrors 18 and 20 are shown with apertures therein, any other optical arrangement can be utilized within the instant invention as long as the function of these apertures remain. In other words, a series of beam altering devices, such as lenses or mirrors, may be used in place of apertures 24 and 26. In addition, a plurality of relatively small, closely spaced reflective, holographic, weak phase gratings 28 ($\lambda/100$) are formed on primary mirror 18 either by etching or any other conventional procedure.

Reference is now made to the wavefront sensor 22 which contains therein a plurality of conventional intensity detectors 34 in the form of, for example, photodiodes or the equivalent, a plurality of conventional carrier frequency discriminators 35 and a plurality of conventional phase detectors 37 and a conventional correlator 39 electrically interconnected in a manner to be described in detail hereinbelow. For proper operation of the instant invention there is a corresponding intensity detector 34, discriminator 35 and phase detector 37 associated with wavelength sensor 22 for each grating 28 on primary mirror 18. Each beam 32 is therefore directed onto its corresponding intensity detector 34, this being accomplished by any conventional imaging system, for example, a plurality of lenses 36 (only one being shown in the drawing) which effectively image 32 on respective detectors 34. If, however, the beams 32 are sufficiently separated, no lenses 36 may be required.

Interposed between the secondary mirror 20 and the lenses 36 (if required) is a device for interrupting the intensity of a spot formed by each beam 32. This device may take the form of a crossed Ronchi chopper disk 38 (more clearly illustrated in FIG. 2 of the drawing) or spinning cylinder. Any suitable driving means such as motor 40 can be electrically connected to disk 38 in order to rotate disk 38 at a predetermined speed.

Also forming part of wave sensor 22 is any suitable alignment system 42 which provides an alignment spot whose position is known. The alignment system 42 may be in the form of a conventional Inertial Reference Unit Alignment System. Alignment system 42 incorporates therein a conventional laser 44 and its respective intensity detector 34, discriminator 35 and phase detector 37. The imaged spot from the alignment beam is received by its intensity detector 34. This alignment spot will have a spatial position $X_A$, $Y_a$ which is accurately and absolutely known. The spatial position $X_A$, $Y_a$ will be fed into correlator 39 after processing by discriminator 35 and detector 37.

During actual operation of the sampling system 12, laser beam 13 is directed through aperture 24 of primary mirror 18 and onto the reflective surface of convex secondary mirror 20. Mirror 20 receives beam 13 and expands or diverges beam 13 and directs it onto the reflective surface of concave primary mirror 18. Upon striking mirror 18, the zeroeth order output 48 of gratings 28 are the projected high energy portion of beam 13 since, in this order, the usual laws of reflection apply. Output 48 is a nominally collimated beam along the optic axis of beam expander 16. Beam 48 is not affected by the presence of gratings 28, its accuracy being solely a function of laser wavefront input, relay optics and the accuracy of the wavefront of beam expander 16.

The first order output beams 32 of beam 13 of each grating 28 is a portion of output beam 48 tilted and focused onto wavefront sensor 22. The relative spot positions of the first order output beams 32 are determined in the following manner. Beams 32 (visible or infrared) are incident at a plane (the reference plane) containing the crossed Ronchi chopper disk 38. As clearly shown in FIG. 2 of the drawing the crossed Ronchi chopper disk 38 is made up of a disk 50 on which is imprinted or the like alternate crossed strips of opaque and transparent sections or portions 52 and 54, respectively. These portions 52 and 54 chop beams 32 with a phase dependent upon the position of the light spot position. Beams 32 then pass through Ronchi disk 38 and are incident upon respective intensity detectors 34 which measure the phase of the chopping.

The chopping frequency is well known to be the speed of, V, of the rotation of disk 38 divided by the grating spatial period, P.

$$f = V/P$$

The phase lag of the chopped signal is given by $$\phi = 2\pi\Delta/P$$

where $\Delta$ is the amount of the spot moves from the reference plane origin in the direction of the motion of disk 38 (the direction of arrow). When the spot moves one grating period away from the reference origin one cycle is lost. The phase of the measured signal is then identical with that expected from a spot at the origin. This $2\pi$ ambiguity may be removed by either counting cycles (if the spot is originally at the reference plane origin) or by marking a portion of the grating in such a way as to identify a particular grating period (i.e., fill it in or leave it out). In this latter situation, the spot position may be determined by noting the time the particular grating section passes through the spot. With the crossed Ronchi grating disk 38 utilized with this invention, the grating period of Ronchi disk 38 is larger than twice the spot size so that a full chopping (blockage) of the spot will occur.

Ronchi disk 38 need not have transparent and opaque portions of equal width so long as the opaque portion completely blocks beams 32. With the crossed Rondi disk 38 as shown in FIG. 2 of the drawing sensing takes place in both the direction along the grating period (the Q direction) and the position in the orthogonal axis (the p axis). The period of the two crossed gratings must differ so that the chopped signal contains two frequency components:

$$f_q = V/P_Q$$

and $$f_p = V/P_P$$

The two frequency components in the detected signal are separated electronically by means of a conventional carrier frequency discriminator 35 electrically connected to each intensity detector 34, respectively. The electronic phase of each component of the frequency of each spot is detected by conventional phase detectors 37 and compared either separately or synchronously to the reference spot provided by alignment system 42 by means of a conventional phase comparator 39 electrically connected to each phase detector 37. This comparison yields the desired relative spot position difference measurement.

Although this invention has been described with reference to a particular embodiment, it will be understood to those skilled in the art that this invention is also capable of further and other embodiments within the spirit and scope of the appended claims.

I claim:

1. In a grating wavefront sampling system having means for providing a quasi-monochromatic beam of light, a beam expander made up of a primary and a secondary mirror, means on said primary mirror for diffracting a portion of said quasi-monochromatic beam of light thereby establishing at least one diffracted beam of light and a wavefront sensor optically aligned with said diffracted beam of light, the improvement therein being in the form of a light spot position sensor incorporated within said wavefront sensor, said light spot position sensor comprising means optically aligned with said diffracted beam of light for detecting the intensity of said diffracted beam of light, means positioned adjacent to said intensity detecting means and in optical alignment with said diffracted beam of light for interrupting said diffracted beam of light at a predetermined period of time so as to produce two frequency components, said diffracted beam of light producing a spot of light on said light interrupting means, the relative position of which is unknown, means for providing a spot of light having two frequency components and the position of which is known, means for detecting the intensity of said known spot of light, means operably connected to said intensity detecting means of said unknown and said known spot of light, respectively, for separating the frequency components thereof, means operably connected to said frequency separating means for detecting the phase of each of said frequency components of said unknown and said known spot of light and means operably connected to said phase detecting means for comparing each of said phases of said unknown and said known spot of light thereby providing a signal representative of the relative spot position difference between said unknown and said known spot of light.

2. In a grating wavefront sampling system as defined in claim 1 wherein said light interrupting means has a crossed Ronchi grating design thereon.

3. In a grating wavefront sampling system as defined in claim 2 wherein said crossed Ronchi grating design is made up of opaque and transparent portions wherein the width of each of said opaque portions completely block said diffracted beam of light when optically aligned therewith.

4. In a grating wavefront sampling system as defined in claim 3 wherein the period of the two crossed Ronchi gratings differ in such a manner that said interrupted diffracted beam of light contains said two frequency components.

5. In a grating wavefront sampling system as defined in claim 4 wherein there are a plurality of diffracted beams of light and the number of intensity detecting means corresponds to the number of diffracted beams of light, each of said diffracted beams of light impinging upon a separate intensity detecting means.

6. In a grating wavefront sampling system as defined in claim 5 further comprising means interposed between said light interrupting means and said intensity detecting means for directing each of said diffracted beams of light to said separate intensity of detecting means.

7. In a grating wavefront sampling system as defined in claim 6 wherein said light interrupting means is a crossed Ronchi chopper disk.

8. In a grating wavefront sampling system as defined in claim 7 further comprising means for rotating said crossed Ronchi chopper disk at a predetermined speed.

* * * * *